(12) United States Patent
Drury et al.

(10) Patent No.: US 7,366,525 B2
(45) Date of Patent: Apr. 29, 2008

(54) COMMUNICATION RESOURCE SELECTION WITHIN A MULTI-BAND WIRELESS COMMUNICATION SYSTEM

(75) Inventors: Eric Drury, Lake Zurich, IL (US); Joseph M. Pedziwiatr, LaGrange, IL (US); Colleen K. Steward, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 186 days.

(21) Appl. No.: 10/955,468

(22) Filed: Sep. 30, 2004

(65) Prior Publication Data

US 2006/0073846 A1 Apr. 6, 2006

(51) Int. Cl.
*H04Q 7/20* (2006.01)
(52) U.S. Cl. .................. 455/458; 455/426.1; 455/450; 455/451; 455/452.1; 455/552.1; 455/101; 455/447; 455/103; 455/422.1
(58) Field of Classification Search ..... 455/450–452.1, 455/552.1, 101–103, 440, 447, 426.1, 458, 455/422.1, 426
See application file for complete search history.

(56) References Cited

U.S. PATENT DOCUMENTS

| | | | |
|---|---|---|---|
| 6,181,945 B1 * | 1/2001 | Lee | 340/7.21 |
| 6,714,789 B1 * | 3/2004 | Oh et al. | 455/456.1 |
| 2003/0078037 A1 | 4/2003 | Auckland et al. | |
| 2004/0152475 A1 * | 8/2004 | Kim | 455/458 |

* cited by examiner

*Primary Examiner*—Duc M. Nguyen
*Assistant Examiner*—Justin Lee

(57) ABSTRACT

Upon determining (11) a need to transmit a message (such as a paging message) to a mobile station within a multi-band wireless communications system, the system (via, for example, a mobile switching center) identifies (12) discrete geographic locations within the system having a likelihood of presently supporting the mobile station and further identifies (13) a band within the multi-band system that also has a present likelihood of presently supporting the mobile station. This information is then used (14) (for example, by a base station controller) to identify one or more communication resources to be allocated for use when transmitting the message.

18 Claims, 5 Drawing Sheets

COMMUNICATION RESOURCE SELECTION WITHIN A MULTI-BAND WIRELESS COMMUNICATION SYSTEM

TECHNICAL FIELD

This invention relates generally to wireless communication systems and more particularly to multi-band wireless communication systems.

BACKGROUND

Wireless communication systems of various kinds are known in the art. In general, wireless-based communication resources tend to be relatively scarce as compared to potential need at any given time (as used herein, "communication resources" tends generally to refer to bandwidth access and encompasses more particularly such elements as frequency bands, assigned frequencies and/or time slots, transmit power, spreading codes, and so forth). Consequently, conservation of communication resource allocation and usage tends to comprise an area of considerable interest and endeavor.

Many wireless communication systems utilize geographic re-use of one or more communication resources. For example, modern cellular telephony typically deploys, in a cellular fashion, a large plurality of base stations that transmit and receive using relatively low power. So configured, base stations (and/or their constituent sectors) that are located sufficiently distant from one another are able to use identical communication resources (such as a common transmit or receive frequency). This, in turn, greatly leverages the effective bandwidth and loading power of a given communication resource. Unfortunately, such distribution does not always yield the desired results.

Paging needs typify one such area of concern. There are various reasons and occasions that require a paging message to be transmitted to one or more mobile stations (as used herein, "paging" will be understood to comprise messages that are sent to the mobile station in order to elicit its response and hence facilitate ascertainment of its location within the system as well as messages that are sent to the mobile station in order to deliver a typically brief message, such as a Short Message Service message, a call-waiting notification, and the like). Such reasons and occasions, however, are often asynchronous and can occur when uncertainty may exist as regards a present precise location of the target mobile station within the communication system.

One suggested approach would cause the paging message to be transmitted from one base station at a time in seriatim fashion until the target mobile station has been located. While potentially conservative of communication resources, this approach can also consume a considerable amount of time. In many cases the required timeframe is incompatible with other needs and requirements that must be met.

Another suggested approach would have every base station transmit, essentially together though not necessarily synchronously, the paging message. This approach has the benefit of likely quickly locating the target mobile station, but also requires widespread use of communication resources, most of which are obviously not genuinely required. This approach, therefore, can significantly impact overall system throughput and bandwidth availability.

As a result, a more typical approach represents something of a compromise between these two extremes. The system identifies a base station that represents a target mobile station's last known geographic location. The paging message is then sourced using only that base station or by using a so-called Location Area Code (LAC) (or Codes) that includes this base station and other base stations that are reasonable to include (such as base stations that are neighbors of the last known location). When properly implemented, such an approach can serve in an effective and timely manner while also tending to facilitate conservation of a given system's communication resources.

Continued development and progress, however, has led to further system changes. As some networks have grown, they have outgrown their original allocated frequency band or bands (for example, in the United States, frequency bands for specific kinds of wireless services are allocated and permitted within specified frequency bands located around, for example, 800 MHz, 1.9 GHz, 2.1 GHz, and so forth). In order to grow, a given wireless communication system will often add, as a geographic overlay to an existing infrastructure of base stations, base stations that provide wireless services using a new, different band. As a result, a given geographic area may be covered by multiple base stations as correspond to different frequency bands.

In most cases, a given target mobile station will only be operating at any given moment within one band of a multi-band wireless communication system (even when the mobile station comprises a multi-band capable platform). This, of course, can lead to difficulty again with respect to transmitting a paging message to a give target mobile station in a manner that is both timely and conserving of system resources.

BRIEF DESCRIPTION OF THE DRAWINGS

The above needs are at least partially met through provision of the method for communication resource selection within a multi-band wireless communication system described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, upon determining a need to transmit a message to a given mobile station within a multi-band wireless communication system, one identifies at least one discrete geographic location having a likelihood of presently supporting the given mobile station. One then further identifies at least one band of the multi-band wireless communications system having a likelihood of presently supporting the given mobile station, and uses both the discrete geographic location and the at least one band to identify at least one communication resource within the multi-band wireless communication system to use when transmitting the message to the given mobile station.

As used herein, "band" comprises any of a wide variety of allocable system resources as tend to be characterized with allocation-based agility. Examples include, but are not limited to, bands such as a frequency band (comprised, for example, of numerous frequency carrier-based channels), a modulation type, and the like.

So configured, a paging message destined for a given mobile station can typically be timely directed and sourced while remaining cautious of system resource usage. More particularly, a paging message can be directed using information concerning not only geographically where a target mobile station was last located, but also as informed by knowledge of "where," with respect to one of a plurality of possible band resources within the system, the target mobile station is now most likely located.

Figure 1:
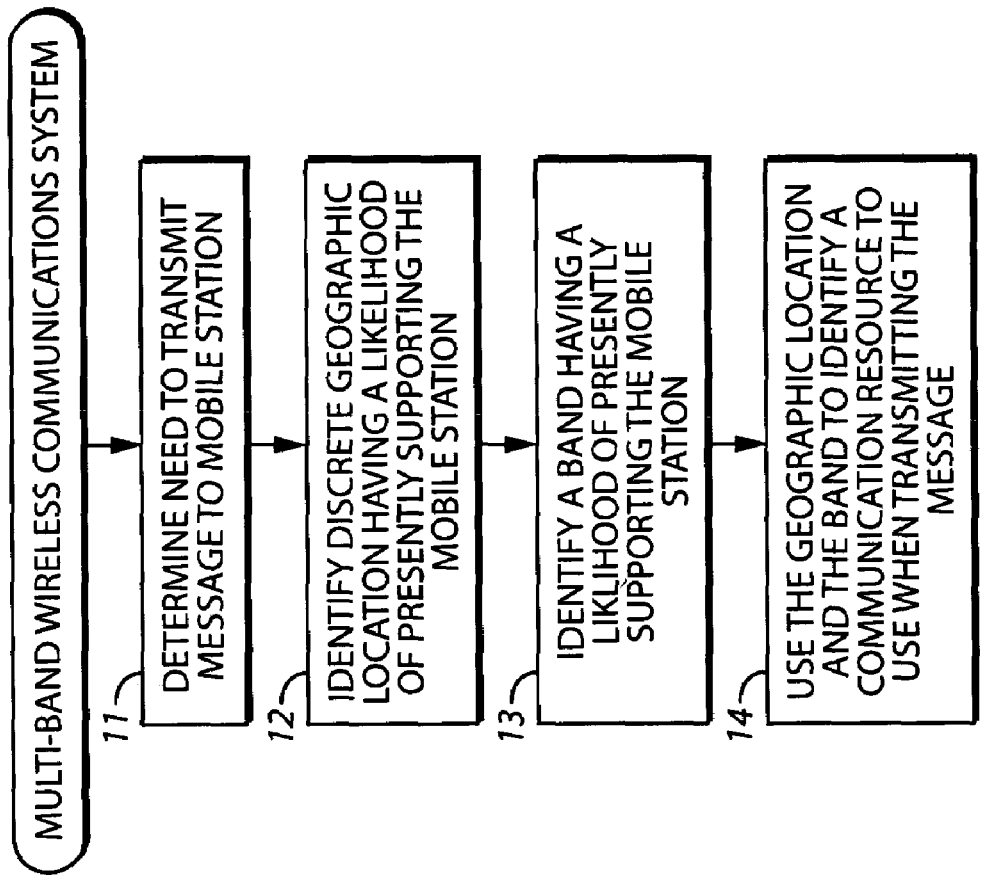
FIG. 1 comprises a flow diagram as configured in accordance with various embodiments of the invention.

These and other benefits may become clearer upon making a thorough review and study of the following detailed description. Referring now to the drawings, and in particular to FIG. 1, a process 10 applicable for use in a multi-band wireless communications system comprised of a plurality of substantially discrete geographic locations essentially begins with a determination 11 that a need exists to transmit a message to a given mobile station within the multi-band wireless communications system. The message can comprise, but is not limited to, a paging message including an initial paging message and a re-paging message as are known in the art.

This process 10 also provides for identification 11 of at least one discrete geographic location within the system having a likelihood of presently supporting the given mobile station. Pursuant to a preferred approach, this at least includes identifying the discrete geographic location that most recently provided wireless communications support to the given mobile station. (The value of the latter, of course, can vary, particularly with the passage of time. As a result, in some cases, it may not be useful to identify or otherwise make use of this particular item of information.) In many cases it may also be useful to access other information of interest, such as the identity of neighboring geographic locations, user profile contents that may provide information of potential relevance, historical usage patterns, and so forth. Such information is known in the art and other factors may well be developed in the future. As these teachings are not especially sensitive to the selection of any particular scheme in this regard, additional elaboration will not be provided here for the sake of brevity and the preservation of focus.

This process 10 then further provides for the identification 13 of at least one band of the multi-band wireless communications system also having a likelihood of presently supporting the given mobile station. This can comprise, for example, identification of a last band as was most recently used when providing wireless communications support to the given mobile station. Specifics regarding the band will vary, of course, from system to system. For example, in some systems, the band will relate to a frequency band (as when a given wireless communications system utilizes two separate and discrete frequency bands to provide wireless services in parallel with one another over a given geographic expanse). To illustrate, when the given mobile station last communicated using a first allocated frequency band of two possible allocated frequency bands, this process may identify this first allocated frequency band as having a likelihood of presently supporting the given mobile station.

This process 10 then uses 14 the above information (i.e., the information regarding at least one discrete geographic location and the band likely to be presently supporting the given mobile station) to identify at least one communication resource within the multi-band wireless communication system to use when transmitting the message to the given mobile station. As one illustrative example, this step can comprise identifying a specific base station that services the band of interest in the geographic location of interest for use when transmitting a paging message to a specific mobile station. As a further example, this step can comprise identifying a group of base stations common to the band of interest to use when transmitting this message. Other possibilities exist as will be detailed below.

Figure 2:
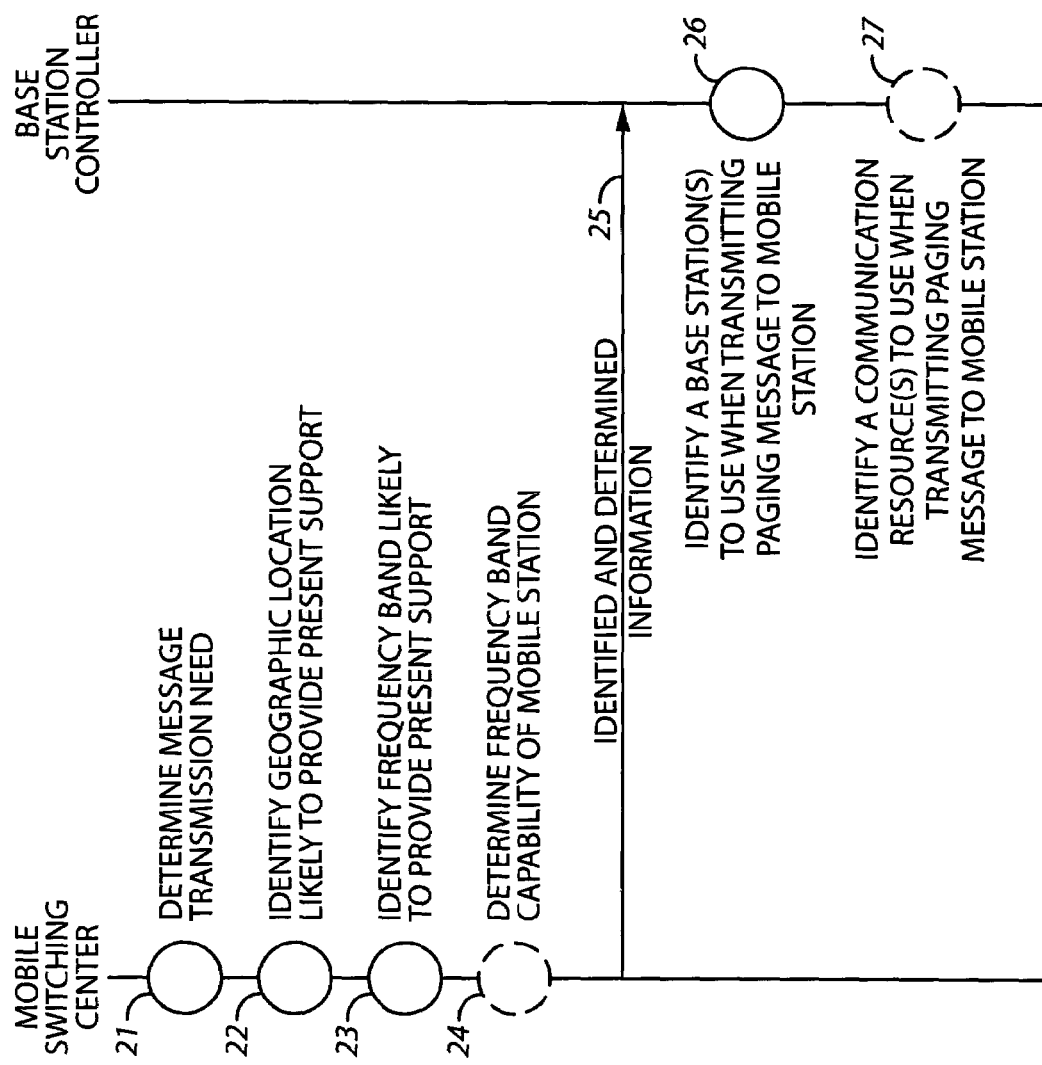
FIG. 2 comprises a timing diagram as configured in accordance with various embodiments of the invention.

Referring now to FIG. 2, this process can be carried forth in a relatively straight forward and effective manner. In this illustrative example a mobile switching center operates in cooperation with a base station controller; those skilled in the art will appreciate that the described functionality and actions can be carried out by other network elements and/or in an otherwise distributed fashion if so desired.

In this example, and upon determining a need to transmit a paging message to a given mobile station within a corresponding multi-frequency band wireless communications system 21, the mobile switching center identifies at least one discrete geographic location having a likelihood of presently supporting the given mobile station 22 and further identifies at least one frequency band of the multi-frequency band wireless communications system having a likelihood of presently supporting the given mobile station 23.

If desired, the mobile switching center may also optionally determine the frequency band capabilities of the given mobile station 24 (for example, the mobile switching center may determine which frequency bands of the multiple frequency bands available within the system the given mobile system may, in fact, be capable of operating on). Such information may be gleaned in various ways. For example, profile information regarding the given mobile station may be locally or remotely available. As another example, historical information regarding past frequency band usage of the given mobile station may be locally or remotely available. As yet another example, the message or request that serves to initiate the need to transmit a paging message may itself present information in this regard. Other possibilities are no doubt available and/or will be developed hereafter.

The mobile switching center then transmits this identified and determined information 25, or information corresponding thereto, to a base station controller (which base station controller, in accord with typical prior art practice, will likely be responsible for the allocation of a number of communication resources such as a plurality of base stations and their corresponding sectors and the like). Pursuant to this illustrative example, the base station controller then uses the received information to identify 26 at least one base station within the multi-frequency band wireless communications system to use when transmitting the paging message to the given mobile station.

In an optional embellishment, the base station controller further uses this information to additionally identify 27 a more specific communication resource (or resources) (as selected from amongst a plurality of candidate communication resources as are supported by the identified base station) to be used by the identified base station when transmitting the paging message. This might comprise, for example, identifying a specific sector as serviced by the base station, or a specific channel to use when transmitting the paging message.

To aid in further illustrating the applicability and breadth of these teachings, a series of examples will now be provided.

EXAMPLE 1

Figure 3:
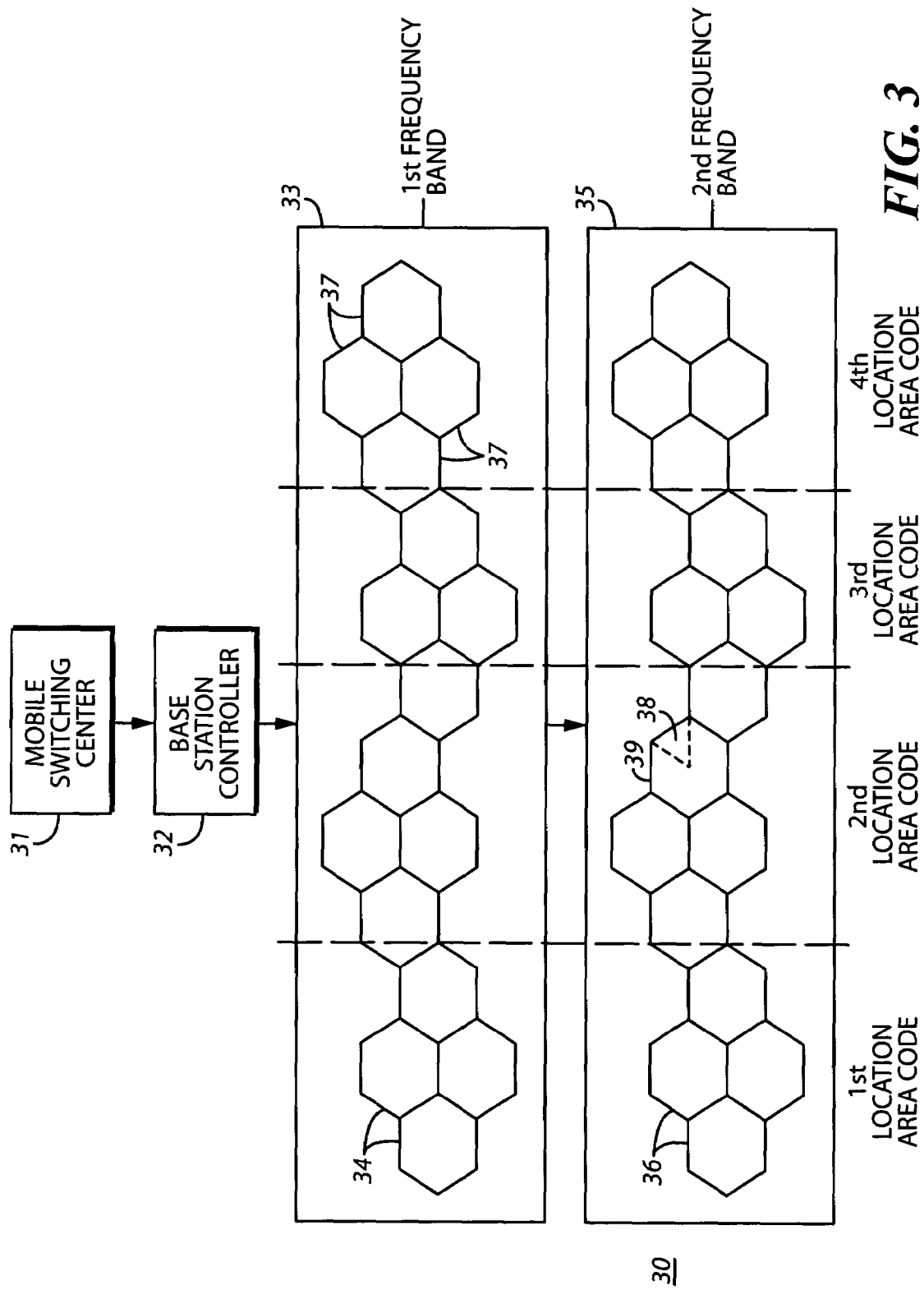
FIG. 3 comprises a schematic system depiction as configured in accordance with various embodiments of the invention.

Referring to FIG. 3, a given multi-band wireless communication system 30 comprises a mobile switching center 31 that operably couples to a base station controller 32 which, in turn, controls the use and allocation of the base stations 34 that support communications within a first frequency band 33 (such as a 2.1 GHz frequency band) and of the base stations 36 that support communications within a second, different frequency band 35 (such as an 800 MHz frequency band). Only four location area codes are depicted in this illustrative example; those skilled in the art will recognize that a typical deployment will more likely include a far greater number of base stations and corresponding location area codes.

In this example, upon determining that a paging message is to be sent to a mobile station that was last known to be operating in the second frequency band 35, the mobile switching center 31 could provide that information to the base station controller 32. The latter could then allocate all of the base stations 36 as service the second frequency band 35 portion of the system 30 for use when transmitting the paging message. This approach at least spares the resources of the first frequency band 33 from being allocated in support of this transmission.

EXAMPLE 2

With continued reference to FIG. 3, in this example the mobile switching center 31 ascertains that the target mobile station was last known to be operating in the fourth location area code within the first frequency band 33. Upon then providing this information to the base station controller 32, the latter could then allocate the base stations 37 that support the first frequency band 33 in the fourth location area code. So configured, system resources are allocated with considerable efficiency. In particular, notwithstanding that the mobile station was last known to be operating in the fourth location area code, the base stations supporting the second frequency band 35 in the fourth location area code remain unallocated with respect to transmission of the paging message.

EXAMPLE 3

With still continued reference to FIG. 3, in this example the mobile switching center 31 determines that the mobile station was last active in a particular sector 38 of a particular base station 39 serving the second location area code within the second frequency band 35. Upon providing this information to the base station controller 32, the latter can make a corresponding allocation of resources; i.e., that particular sector 38 in service of only this particular frequency band is the only resource allocated in support of the paging transmission.

EXAMPLE 4

Figure 4:
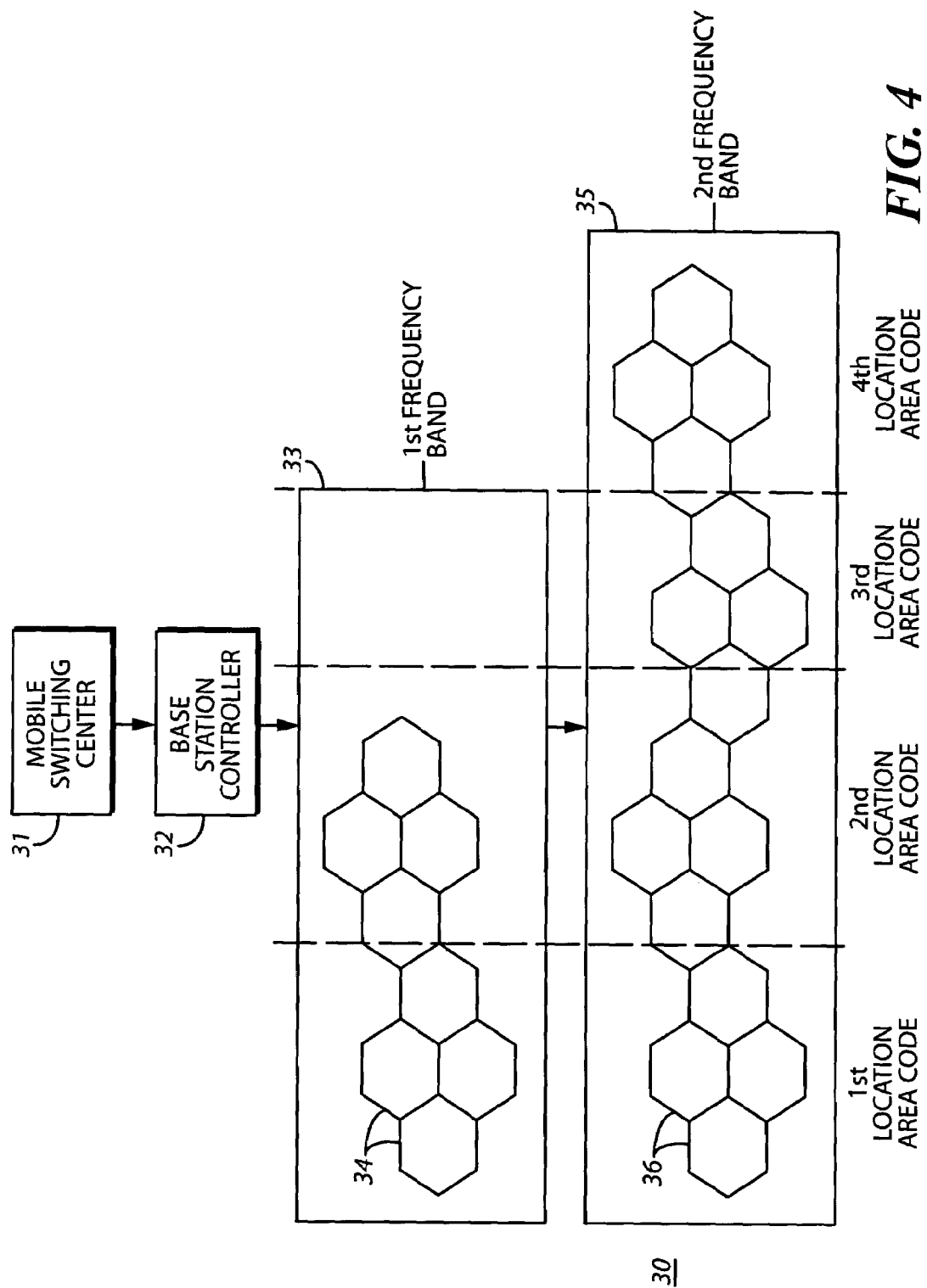
FIG. 4 comprises a schematic system depiction as configured in accordance with various embodiments of the invention.

Referring now to FIG. 4, in this example the first frequency band 33 does not provide coverage as extensive as the coverage offered by the resources of the second frequency band 35. For purposes of illustration, the first frequency band 33 only provides base stations 34 in the first and second location area codes whereas the second frequency band 35 provides base stations 36 in all four specified location area codes.

In this example, the mobile switching center 31 identifies all four location area codes as being likely to include the target mobile station and further identifies the first frequency band as being the frequency band last used by the target mobile station. By providing this information to the base station controller 32, the latter can allocate all first and second location area code base stations 34 for the first frequency band and the base stations 36 of the second frequency band 35 for the third and fourth location area codes when transmitting the paging message. Such an allocation provides the paging message in all available first frequency band locations where the mobile station might be and only those second frequency band location where the mobile station would be forced to shift to the second frequency band in order to continue receiving service from the system 30. So deployed, the base stations of the second frequency band as correspond to the first and second location area codes remain unallocated for this purpose and hence available for other purposes.

EXAMPLE 5

In this example, and with continued reference to FIG. 4, the mobile switching center 31 identifies the first through the fourth location area codes as representing the likely geographic area containing the target mobile station. In addition, in this example, the mobile switching center 31 further identifies that the target mobile station is only capable of operating compatibly in the first frequency band 33 and not in the second frequency band 35. The base station controller 32, using this information, allocates only the base stations 34 as comprise a part of the first frequency band 33 and none of the base stations 36 as service the second frequency band 35, as allocation of the latter will serve no useful purpose in this instance.

EXAMPLE 6

In this example, and still with continued reference to FIG. 4, the mobile switching center 31 identifies all four location area codes as pertaining to the mobile station and further identifies that the mobile station has a corresponding and characterizing band class that is the second frequency band 35. In this example, and so informed, the base station controller 32 allocates base stations 36 for the second frequency band 35 for all four location area codes and none of the base stations 34 for the first frequency band 33. Such a deployment might reflect, for example, a presumption that the mobile station will stay within its previously used frequency band and not switch bands unless and until no such coverage is available.

EXAMPLE 7

Figure 5:
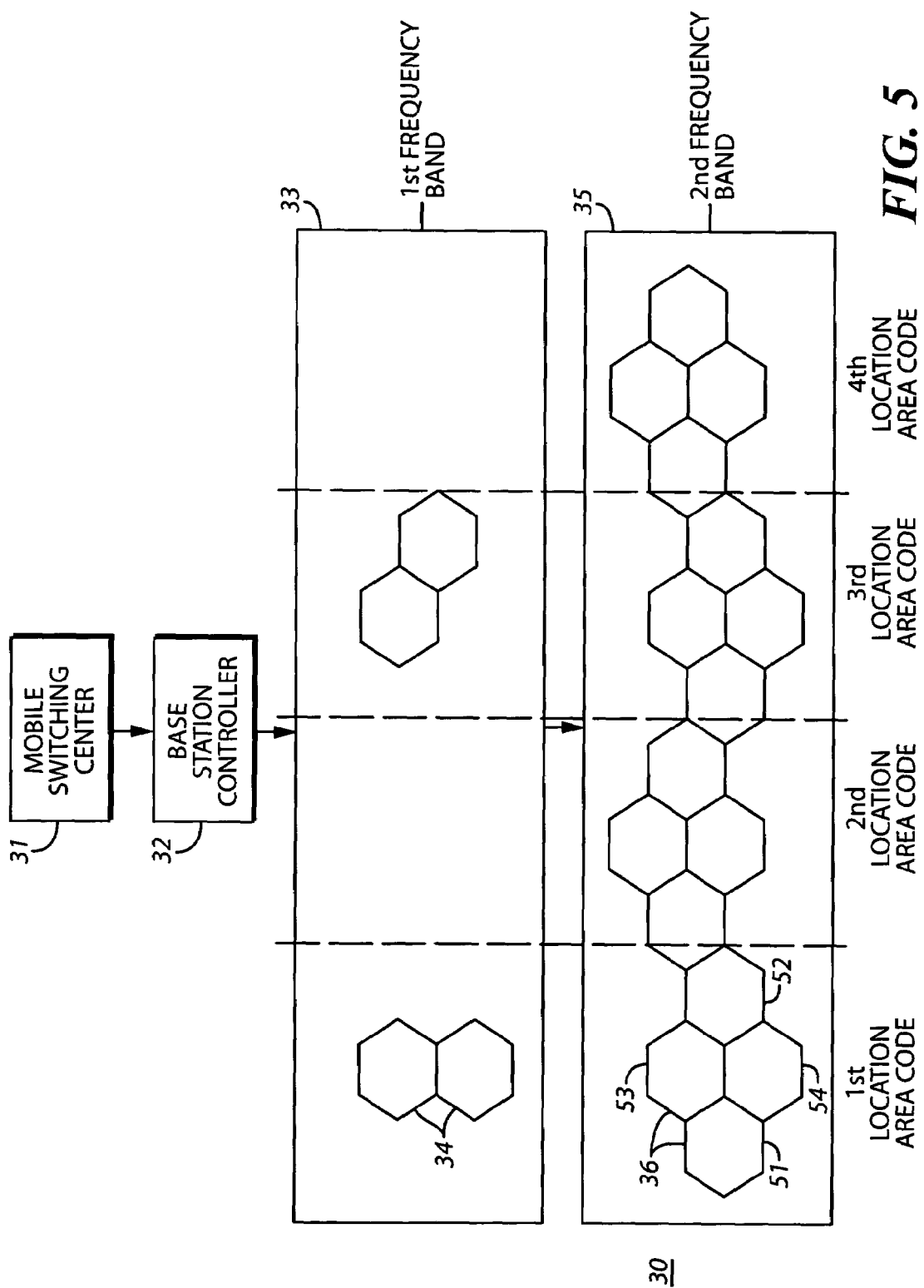
FIG. 5 comprises a schematic system depiction as configured in accordance with various embodiments of the invention.

In this example, and referring now to FIG. 5, the system 30 provides only limited and distributed resources with respect to the first frequency band 33. In this example, the mobile switching center 31 identifies that the mobile station might be likely found in any of the four indicated location area codes and that the mobile station was last known to be operating within the first frequency band. The base station controller 32, being apprised of this information by the mobile switching center 31, allocates all of the first frequency band base stations 34 and, in this example, all non-overlapping second frequency band base stations 36. For example, while all of the second frequency band base stations in the second location area code are allocated pursuant to this approach, only two of the base stations 51 and 52 in the first location area code are so allocated. The remaining two second frequency range base stations 53 and 54 remain unallocated as they overlap with the first frequency band base stations 34 for this location area code.

The reader will appreciate that these examples serve an illustrative purpose and do not comprise an exhaustive listing of all useful applications of these teachings. It should also be clearly evident that these teachings readily facilitate considerably improved allocation of scarce communication resources within a multi-band communication system.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use in a multi-band wireless communications system comprised of a plurality of substantially discrete geographic locations, the method comprising:
    determining a need to transmit a message to a given mobile station within the multi-band wireless communications system;
    identifying at least one discrete geographic location having a likelihood of presently supporting the given mobile station;
    identifying at least one band of the multi-band wireless communications system having a likelihood of presently supporting the given mobile station;
    using the at least one discrete geographic location and the at least one band to identify at least one communication resource within the multi-band wireless communications system to use when transmitting the message to the given mobile station.

2. The method of claim 1 wherein determining a need to transmit a message further comprises determining a need to transmit a paging message to the given mobile station.

3. The method of claim 2 wherein determining a need to transmit a paging message to the given mobile station further comprises determining a need to transmit an initial paging message to the given mobile station.

4. The method of claim 2 wherein determining a need to transmit a paging message to the given mobile station further comprises determining a need to transmit a re-paging message to the given mobile station.

5. The method of claim 1 wherein identifying at least one discrete geographic location having a likelihood of presently supporting the given mobile station further comprises identifying at least one discrete geographic location that most recently provided wireless communications support to the given mobile station.

6. The method of claim 1 wherein identifying at least one band of the multi-band wireless communications system having a likelihood of presently supporting the given mobile station further comprises identifying at least one band of the multi-band wireless communications system that was most recently used when providing wireless communications support to the given mobile station.

7. The method of claim 1 wherein:
    identifying at least one discrete geographic location having a likelihood of presently supporting the given mobile station further comprises identifying at least one discrete geographic location that most recently provided wireless communications support to the given mobile station;
    identifying at least one band of the multi-band wireless communications system having a likelihood of presently supporting the given mobile station further comprises identifying at least one band of the multi-band wireless communications system that was most recently used when providing wireless communications support to the given mobile station.

8. The method of claim 1 wherein identifying at least one band of the multi-band wireless communications system further comprises identifying at least one frequency band of a multi-frequency band wireless communications system.

9. The method of claim 1 wherein identifying at least one band of the multi-band wireless communications system further comprises at identifying at least one of:
    a frequency band of a multi-frequency band wireless communication system;
    a modulation type of a multi-modulation type wireless communication system;
    a communication resource agility type of a multi-communication resource agility type wireless communication system.

10. The method of claim 1 wherein using the at least one discrete geographic location and the at least one band to identify at least one communication resource within the multi-band wireless communications system to use when transmitting the message to the given mobile station further comprises using the at least one discrete geographic location and the at least one band to identify a plurality of communication resources within the multi-band wireless communications system to use when transmitting the message to the given mobile station.

11. The method of claim 1 wherein using the at least one discrete geographic location and the at least one band to identify at least one communication resource within the multi-band wireless communications system to use when transmitting the message to the given mobile station further comprises using the at least one discrete geographic location and the at least one band to identify a least one specific base station within the multi-band wireless communications system to use when transmitting the message to the given mobile station.

12. The method of claim 11 wherein using the at least one discrete geographic location and the at least one band to identify a least one specific base station within the multi-band wireless communications system further comprises using the at least one discrete geographic location and the at least one band to identify a plurality of specific base stations within the multi-band wireless communications system.

13. The method of claim 12 wherein using the at least one discrete geographic location and the at least one band to identify a plurality of specific base stations within the multi-band wireless communications system further comprises using the at least one discrete geographic location and the at least one band to identify a first specific base station within a first band of the multi-band wireless communications system and a second specific base station within a second band of the multi-band wireless communications system, which second band is different than the first band.

14. A method for use in a multi-frequency band wireless communications system comprised of a plurality of substantially discrete geographic locations, the method comprising:

at a mobile switching center:
- determining a need to transmit a paging message to a given mobile station within the multi-frequency band wireless communications system;
- identifying at least one discrete geographic location having a likelihood of presently supporting the given mobile station;
- identifying at least one frequency band of the multi-frequency band wireless communications system having a likelihood of presently supporting the given mobile station;
- providing information regarding the at least one discrete geographic location and the at least one frequency band to a base station controller;

at the base station controller:
- receiving the information;
- using the information to identify at least one base station within the multi-frequency band wireless communications system to use when transmitting the paging message to the given mobile station.

15. The method of claim 14 wherein the mobile switching center further determines frequency band capabilities of the given mobile station and provides additional information regarding the frequency band capabilities to the base station controller.

16. The method of claim 15 wherein the base station controller further uses the additional information when identifying the at least one base station.

17. The method of claim 14 wherein using the information to identify at least one base station further comprises using the information to identify at least one communication resource as is supported by the at least one base station to use when transmitting the paging message to the given mobile station.

18. The method of claim 17 wherein using the information to identify at least one communication resource as is supported by the at least one base station further comprises using the information to identify at least one communication resource from a plurality of candidate communication resources as are supported by the at least one base station.

* * * * *